United States Patent [19]
Dollison

[11] 3,874,414
[45] Apr. 1, 1975

[54] BLOCK AND BLEED VALVE FOR SAFETY SYSTEM

[75] Inventor: William W. Dollison, Dallas, Tex.

[73] Assignee: Otis Engineering Corporation, Dallas, Tex.

[22] Filed: Nov. 7, 1973

[21] Appl. No.: 413,543

[52] U.S. Cl. .................... 137/625.66, 137/625.2
[51] Int. Cl. ............................................ F16k 17/00
[58] Field of Search .................... 137/625.66, 625.2

[56] References Cited
UNITED STATES PATENTS

| | | | |
|---|---|---|---|
| 3,410,309 | 11/1968 | Ludwig | 137/625.66 |
| 3,610,284 | 10/1971 | Spencer | 137/625.66 |
| 3,706,322 | 12/1972 | Carlson | 137/625.66 |
| 3,791,398 | 2/1974 | Vickery | 137/625.66 |

*Primary Examiner*—Harold W. Weakley
*Attorney, Agent, or Firm*—H. Mathews Garland

[57] ABSTRACT

A valve for interconnecting the control fluid chamber of a flowline safety valve, a flowline sensing pilot valve, a pressure source activating the safety valve and pilot valve and an exhaust. The block and bleed valve includes a valve body having a valve chamber communicating with ports leading to the pressure source, the pilot valve, the safety valve, and an exhaust to the atmosphere. A spool-like piston type valve member having flow passage means is slidable in the valve chamber between a first position communicating the pressure source with the pilot and safety valves and a second position communicating the pilot and safety valves with the exhaust and blocking flow from the pressure source. A restriction in the valve member passage means communicating with the pilot valve effects a sufficient lag in pressure equalization across the valve member when the pilot valve opens to cause movement of the valve member from the first to the second position. A manual reset plunger is slidably secured through the housing into the valve chamber for reset of the valve member from the second back to the first position.

6 Claims, 5 Drawing Figures

Fig.3

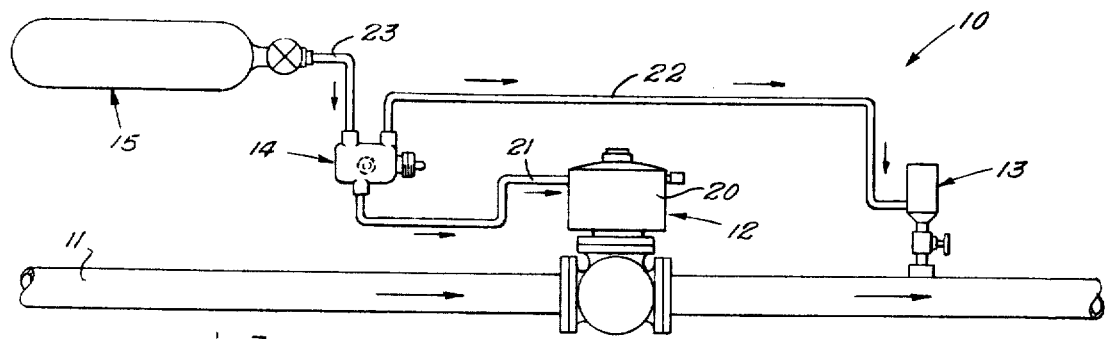
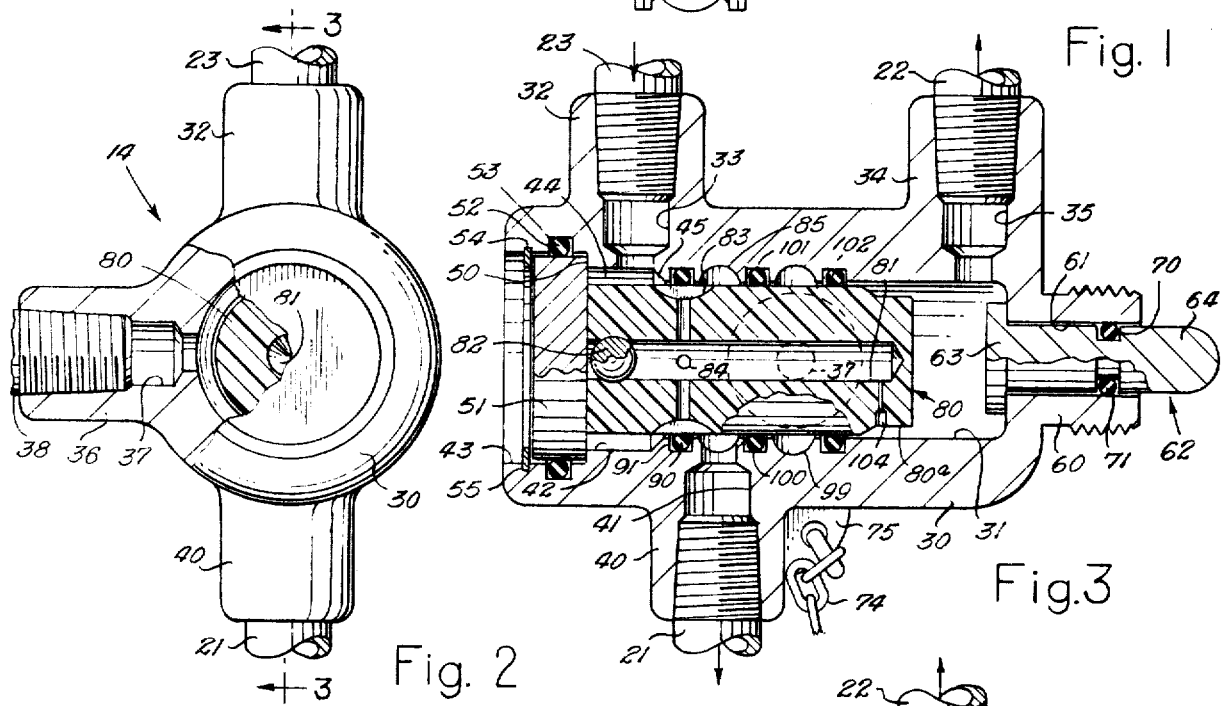
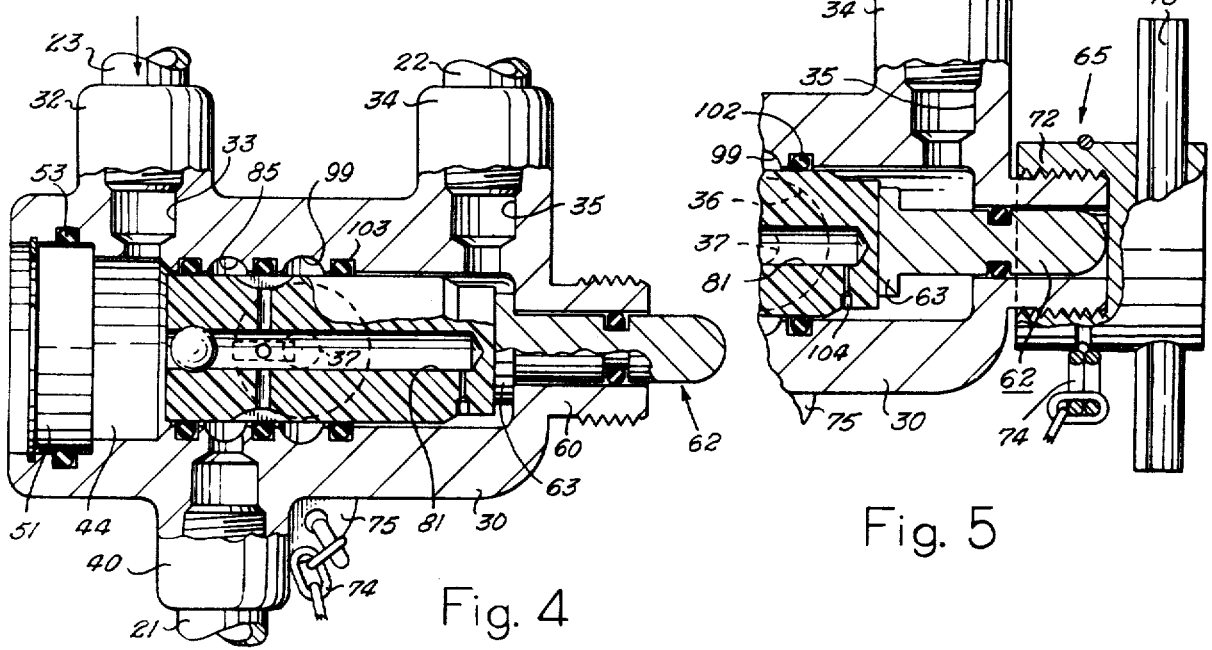

3,874,414

BLOCK AND BLEED VALVE FOR SAFETY SYSTEM

This invention relates to valves and more particularly relates to block and bleed type valves for controlling communication between a pressure source and at least two valves activated by the pressure source.

Valves of the general nature of the present invention have been used for controlling communication between a pressure source, a pilot valve, and a safety valve. Such valves which are known to be available, however, have certain structural features which are believed to be inferior to the present invention. One such feature of the presently available valves is the use of a diaphragm for supporting the valve member and providing a partition between different chamber portions of the valve which operate at different pressures during certain phases of the functioning of the valves. The diaphragms are subject to the deterioration which interferes with valve operation and often requires frequent replacement. Also, known valves of the type of the present invention often include springs which may require adjustment and replacement.

It is, therefore, a principal object of the invention to provide a new and improved form of block and bleed valve for use in a safety valve system.

It is another object of the invention to provide a valve of the character described which communicates a pressure source with a safety valve and a pilot valve and shuts off the pressure source while venting the safety valve and pilot valve to exhaust in response to a pressure change sensed by the pilot valve.

It is another object of the invention to provide a block and bleed valve which utilizes a spool type valve member movable in a valve housing between a first position at which a pressure source is communicated with a pilot valve and a safety valve and a second position at which the pressure source is closed off and the pilot and safety valves are vented to exhaust.

It is another object of the invention to provide a block and bleed valve which has a manual reset feature.

It is another object of the invention to provide a valve of the character described which does not utilize either a spring or a diaphragm connected with the valve member.

In accordance with the invention there is provided a block and bleed valve for use in a safety system including a pilot valve and a flow line safety valve. The block and bleed valve includes a housing having a valve chamber communicating with flow passages or parts adapted to be connected to a pressure source, a pilot valve, a safety valve, and an exhaust which may lead to the atmosphere. A spool type piston valve member is slidable in the valve chamber between a first position at which the pressure source communicates with the safety valve and pilot valve and the exhaust is closed and a second position at which the pressure source is closed off and the pilot and safety valve are communicated with the exhaust. The valve member has a flow passage system which includes a restriction between the portion of the valve chamber communicating with the pilot valve and the portions of the chamber communicating with the safety valve, exhaust, and the pressure source so that the valve member shifts from the first to the second position in response to a pressure drop induced by operation of the pilot valve. A manually operable reset plunger is supported through the valve housing for engaging the valve member to return the valve member from the second back to the first position.

The foregoing objects and advantages of the invention will be better understood from the following detailed description of a preferred embodiment thereof taken in conjunction with the accompanying drawings wherein:

FIG. 1 is a schematic view in elevation showing a typical flow line safety system utilizing the valve of the present invention;

FIG. 2 is an enlarged fragmentary view in elevation, partially broken away, showing one end of the valve of the invention;

FIG. 3 is a view in section of the valve taken along the line 3—3 of FIG. 2 showing the valve member at a first position for connecting a pressure source with pilot and safety valves;

FIG. 4 is a view in section and elevation similar to FIG. 3 showing the valve member moved to a second position shutting off the pressure source and communicating the pilot and safety valves with the exhaust; and FIG. 5 is a fragmentary view in section and elevation taken along the reset end of the valve showing the apparatus for manually resetting the valve member to the first position.

Referring to FIG. 1 of the drawings, a flow line safety system 10 includes a fluid flowline 11, a safety valve 12 for controlling fluid flow along the line 11, a pilot valve 13 for sensing the flowline pressure, a block and bleed valve 14 constructed in accordance with the invention, and a control pressure source 15. The pressure source provides a control fluid pressure through the block and bleed valve to the safety valve and pilot valve. When the pilot valve senses a predetermined pressure in the flowline to which it is designed to respond, which may be a high pressure, a low pressure, or either a high or low pressure, the block and bleed valve is activated to shut off communication from the pressure source and exhaust the pilot and safety valves closing the safety valve for shutting off flow along the flow line. Typically the safety valve may be an Otis type U pneumatic Actuator/Gate Valve Combination and the pilot valve may be an Otis Type P Monitor Pilot, Hi, Lo, or Hi-Lo, shown, respectively, at pages 3520 and 3528 of the *Composite Catalog of Oil Field Equipment and Services*, 1972–73 Edition, published by World Oil, Houston, Tex. The safety valve has a control cylinder 20 which communicates through a line 21 to the valve 14 for supplying control fluid, such as a gas under pressure to hold the safety valve open. The pilot valve is connected by a line 22 with the valve 14 for supplying the control fluid pressure to the pilot valve and communicating the pilot valve to exhaust. Line 23 connects the pressure source 15, which may be a cylinder of a suitable gas or air, with the valve 14.

The three-way block and bleed valve 14 has a generally cylindrical body portion 30 provided with a cylindrical valve chamber 31. The body 30 has an internally threaded boss 32 provided with a flow passage 33 communicating with the pressure source line 23 and the valve chamber 31. An internally threaded boss 34 on the valve body is provided with a flow passage 35 communicating the valve chamber with the flow line 22 leading to the pilot valve. An internally threaded boss 36 has a flow passage 37 connecting the valve chamber with an exhaust 38 to the atmosphere. An internally threaded boss 40 on the valve body provides a flow passage 41 communicating the flow line 21 from the safety valve with the valve chamber at a location between the pressure supply and pilot valve passages 33 and 35.

The valve chamber 31 in the valve body 30 is enlarged along a portion 42 and still further enlarged along an end portion 43 opening through one end of the valve body at the boss 32. The enlarged bore portion 42 defines an annular flow space 44 which communicates with the supply source flow passage 33 for unrestricted flow of supply pressure fluid into the valve chamber. The enlarged bore portion 44 is inwardly tapered at 45 to direct the supply fluid along the valve member toward the passage 41 to the safety valve. At the juncture of the enlarged bore portion 43 with the bore portion 42 an internal annular stop shoulder 50 is provided in the valve body to support a disc shaped chamber closure member 51. The valve body as an internal annular recess 52 around the chamber portion 43 for a ring seal 53 to seal between the valve body and the closure disc 51. A split retainer ring 54 is secured in an internal annular recess 55 around the bore portion 43 between the open end of the bore portion and the recess 52 for locking the closure disc 51 in place to seal the open end of the valve chamber 31.

The end of the valve body 30 adjacent to the flow passage 35 to the pilot valve has an externally threaded boss 60 provided with a smooth longitudinal bore 61 formed along an axis coincident with the axis of the valve chamber 31. A valve reset plunger 62 is slidably positioned through the bore 61 for resetting the block and bleed valve. The reset plunger has a piston head 63 located within the valve chamber 31 on an integral rod 64 which extends outwardly of the boss 60 for engagement by an internally threaded reset nut 65, see FIG. 5. The reset plunger rod has an external annular recess 70 for a ring seal 71 which seals around the plunger rod with the surface of the bore 61 through the boss 60 providing a pressure closure along the bore 61 leading to the valve chamber 31. The reset nut 65 has an internally threaded body 72 and a cross handle 73 for rotating the nut when engaged on the boss 60 for resetting the valve. The reset nut 65 has an internally threaded body 72 and a cross handle 73 for rotating the nut when engaged on the boss 60 for resetting the valve. The reset nut is connected by a chain 74 to a flange 75 on the valve body for safe keeping of the nut when not in use. The nut hangs freely on the chain when not engaged as in FIG. 5.

The block and bleed valve 14 is controlled by a spool shaped piston-type valve member 80 which is slidable in the valve chamber 31 between a first position, FIG. 3, for communicating the pressure source with the pilot and safety valves and a second position, FIG. 4, for blocking off flow from the pressure source and communicating the pilot and safety valves to the exhaust. The valve member 80 has a generally cylindrical shape with a longitudinal flow passage chamber 81 formed by a blind bore opening through one end of the valve member and closed by a steel ball 82 forced into the open end of the bore. The valve member has an external annular recess 83 which communicates with a plurality of circumferentially spaced radial flow passages 84 connecting with the central passage 81. The recess 83 and the passages 84 are positioned in the valve member near the end of the valve member at the flow passage 33 leading to the pressure source and are located to communicate the annular space 44 with an internal annular recess 85 formed in the valve body around the valve chamber between the flow passage 33 to the pressure source and the flow passage 41 to the safety valve 12. A ring seal 90 in an internal annular recess 91 of the valve body around the valve chamber between the annular space 44 and the recess 85 seals around the valve member at the second position shown in FIG. 4 to block off the flow from the pressure fluid passage 33 leading to the source 15. A second internal annular recess 99 provided in the valve body around the chamber 31 spaced from the recess 85 communicates the safety valve flow passage 41 with the exhaust flow passage 37 through the recess 83 in the valve member when the valve member is in the second position of FIG. 4. A ring seal 100 within a recess 101 in the valve body around the valve chamber between the flow recesses 85 and 100 isolates the recesses from each other when the valve member is at the first position of FIG. 3 to close off the exhaust passage. A third ring seal 102 within an internal annular recess 103 of the valve body around the valve chamber between the recess 100 and the flow passage 35 to the pilot valve seals around the valve members to isolate the exhaust flow passage from the pilot valve flow passage at all positions of the valve member so that the communication between the exhaust flow passage and the pilot valve slow passage is restricted to the passage system through the valve member.

The valve member 80 is reduced in diameter along the inward end portion 80a which is provided with a restricted radial passage 104 extending through the valve member wall into the central passage 81 of the valve member to provide restricted communication between the passage 81 and the end portion of the valve chamber 31 communicating with the pilot valve passage 35. The cross sectional area of the passage 104 is extremely small compared with the sum of the cross-sectional areas of the passages 84. The passage 104 not only permits pressure conditions to develop responsive to the pilot valve to shift the valve member from the first position of FIG. 3 to the second position of FIG. 4, but also allows for communication of the pilot valve with the pressure fluid source at the first position of the member.

The normal operating mode of the block and bleed valve 14, when the safety valve is open, is shown in FIG. 3. The valve member 80 is at the left end first position for communicating the pressure source 15 with the safety valve 12 and the pilot valve 13. The fluid pressure from the source 15, which may be air or gas, is communicated into the valve 14 through the line 23 and the flow passage 33 in the valve body. The fluid pressure is communicated through the annular portion 44 of the valve chamber into annular recess 83 around the valve member. At the first position of the valve member, the recess 83 communicates around the ring seal 90 with both the annulus 44 and the valve body recess 85. The recess 85 is in communication with the lateral flow passage 41 which leads to the line 21 to the control cylinder 20 of the safety valve. Thus, the control fluid pressure from the source 15 communicates along the valve member from the passage 33 past the ring seal 90 into the passage 41 to the safety valve. The ring seal 101 within the valve body around the valve member isolates the annular valve member recess 85 from the recess 99 which connects with the exhaust passage 37, while, similarly, the ring seal 102 isolates the recess 99 from the pilot valve end of the valve chamber so that none of the operating passages at this stage are connected with the exhaust. The control fluid pressure from the source 15 within the valve member recess 83 is also communicated inwardly through the radial passages 84 of the valve member into the internal longitudinal passage 81 of the valve member. The pressure within the valve member passage 81 is communicated laterally outwardly through the restricted passage 104 into the pilot valve end of the valve cylinder 31 to the pilot valve lateral passage 35 thereby supplying control fluid pressure to the pilot valve which remains in an operative sensing condition until either a high or low pressure, depending upon the nature of the pilot valve, within the flow line 11 downstream of the safety valve causes the pilot valve to operate. Thus, in the valve condition represented in FIG. 3, the first position of the valve member 80 communicates the pressure source 15 with the safety valve 12 and the pilot valve 13 while isolating the pressure source, the pilot valve, and the safety valve from the exhaust passage 37. Since at this stage of operation the pressure within the pilot valve end of the chamber 31 exceeds atmospheric, such as from about 30 to 150 pounds per square inch, the reset plunger 62 is at the extended position of FIG. 3.

When the pilot valve 13 senses a pressure condition in the flow line 11 which is a predetermined high or low level, depending upon the type and setting of the valve, the pilot valve functions to immediately release and vent to the atmosphere through the pilot valve the operating control fluid pressure as communicated to the pilot valve through the line 22. This sudden drop in pressure due to the opening of the pilot valve rapidly reduces the pressure in the lateral passage 35 of the valve body 30 and the pilot valve end of the valve chamber 31 at the reset plunger. At the moment of the pilot valve pressure reduction within the valve chamber, the pressure supplied from the source 15 through the lateral passage 33 is still at full control fluid operating pressure, which may be 30 to 150 psi. The pilot valve induced reduced pressure is thus acting upon the right end of the valve member as seen in FIG. 3 over the cross section of the member defined by the ring seal 102, while the higher control fluid pressure is acting on the left end of the valve member over a cross sectional area defined by the ring seal 101, which is the same cross sectional area as acted upon by the reduced pilot valve pressure. The higher pressure from the supply fluid source forces the valve member immediately to the right end position shown in FIG. 4 at which the right end of the valve member engages the reset plunger piston head 63. At this second right end position of the valve member, the control fluid from the supply source 15 is shut off and thus confined to the space 44 within the valve chamber at the left end of the valve member as seen in FIG. 4 by the engagement of the ring seal 90 with the valve member. Since the ball 82 plugs the open end of the chamber 81 in the valve member, no flow can occur from the space 44 through the valve member. At this second position of the valve member, the valve member recess 83 spans the center ring seal 101, thereby communicating the valve housing recesses 85 and 100. Since the recess 85 communicates with the lateral passage 41 leading to the safety valve cylinder 20 and the recess 100 communicates with the exhaust lateral passage 37, the control cylinder of the safety valve is rapidly exhausted of control fluid through the block and bleed valve exhaust passage 37 permitting the safety valve to close. The control fluid flows from the cylinder 20 of the safety valve through the line 21 into the lateral flow passage 41 of the valve body 30. The fluid flows from the passage 41 along the valve member passage 83 into the valve body recess 100. From the recess 100, the fluid flows outwardly to exhaust the valve body through the lateral passage 37. At the same time, the pilot valve is communicated through the line 22, the lateral valve body passage 35, and the end of the valve chamber 31 at the reset plunger into the lateral restricted passage 104 of the valve member through which the pilot valve pressure communicates into the longitudinal passage 81 of the valve member, the lateral valve member passages 84, the valve member recess 83, and the valve body passage 99 to the exhaust passage 37. Thus, the exhaust from the block and bleed valve 14 is simultaneously communicated with both the safety valve and the pilot valve at the second position of the valve member 80, and the control fluid pressure in the source 15 is blocked off from both the safety and pilot valves and also from the exhaust.

The block and bleed valve 14 is reset with the reset nut 65 as shown in FIG. 5. The reset nut is threaded onto the boss 60 engaging the outward extended end of the reset plunger rod 65 as seen in FIG. 4 forcing the reset plunger inwardly into the valve chamber 31 as shown in FIG. 5. As shown in FIG. 4, when the valve member 80 moved to the right end second position, it engaged the piston head 63 of the reset plunger. Thus, the forcing of the reset plunger back into the valve body to the position shown in FIG. 5 moves the valve member 80 back to the first position of FIG. 3. At such first position, the exhaust passage 37 is again isolated from the control fluid supply source, from the safety valve, and from the pilot valve. The control fluid source is also reconnected with the safety valve 12 and the pilot valve 13. The control fluid pressure is then communicated through the line 21 to the safety valve cylinder 20 and through the line 22 to the pilot valve. As soon as the control fluid pressure at the safety valve is at a sufficiently high level, the safety valve reopens to restore normal line pressure. The particular Otic P-Type Pilot Valve will automatically reset when the normal pressure in the line 11 is restored at the pilot valve. The reset nut 65 is left in place as shown in FIG. 5 until the safety valve system 10 is back in operation at which time the reset nut is removed and the pressure within the valve chamber 31 restores the reset plunger 62 to the position shown in FIG. 3. The system may thereafter function in response to the pilot valve to actuate the safety valve as described.

It will be seen that the three-way block and bleed valve 14 effectively communicates a safety valve and the pilot valve with a control fluid pressure source and activates the safety valve to close it responsive to a change in a predetermined condition sensed by the pilot valve. The block and bleed valve exhausts the safety and pilot valves while shutting in and preserving the pressure from the control fluid source. The block and bleed valve requires no springs or diaphragm for operation and is readily manually reset so that the safety system is not accidentally reactivated.

What is claimed is:

1. A valve device for selectively communicating a first port with second and third ports in one mode of valve operation and for communicating the second and the third ports with a fourth port blocking the first port in a second mode of valve operation, said device comprising: a housing having a valve chamber therein, said housing having first, second, third and fourth ports communicating with said valve chamber; a valve member disposed in slidable relation in said valve chamber for movement between a first position at which said valve is in said first operation mode and a second position at which said valve is in said first operation mode and a second position at which said valve is in said second operation mode; said housing and said valve member being provided with passage means communicating said first port with said second and third ports at said first position and communicating said second and third ports with said fourth port at said second position while shutting off said first port; and reset means comprising a piston slidably disposed through said housing having a piston head in said valve chamber at the end of said valve chamber communicating with said third port for engaging an end of said valve member to move said valve member back from said second to said first position.

2. A valve device in accordance with claim 1 including means for engaging said piston and telescoping said piston into said housing resetting said valve member.

3. A valve device in accordance with claim 2 wherein said means for engaging said reset piston comprises a nut having a handle and threadable onto said housing over said reset piston.

4. A valve device for selectively communicating a first port with second and third ports in one mode of operation of said device and for communicating the second and third ports with a fourth port while shutting off the first port in a second mode of operation of the device, said valve device comprising: a housing having a cylindrical valve chamber therein, said housing having first, second, third, and fourth ports disposed radially relative to said valve chamber and spaced longitudinally along said chamber; a first internal annular seal means within said housing around said valve chamber between said first port and said second port; a second internal annular seal means within said housing around said valve chamber between said second port and said fourth port; a third internal annular seal means in said housing around said valve chamber between said fourth port and said third port; said housing having a first internal annular recess defining a flow passage between said first and second seal means communicating with said second port; said housing having a second internal annular recess around said valve chamber between said second and said third internal annular seal means communicating with said fourth port; a cylindrical piston-type valve member slidable in said valve chamber for controlling communication between said ports opening into said valve chamber, said valve member having an internal flow passage chamber, first flow means opening through said valve member into said internal flow passage, said first flow means communicating said first housing port with said first internal annular recess of said housing when said valve means is at a first position and said first flow means communicating said first and second internal annular flow passage means of said housing when said valve member is at a second position, and said valve member having a second flow means communicating with said central flow passage and having a cross sectional area less than said first flow means and being in communication with said third port at both positions of said valve member; said valve member communicating said first port with said second and third ports at said first valve member position and communicating said second, third and fourth ports together while isolating said first port at said second valve member position; and a reset piston slidably disposed through said valve housing and having a head end in said valve chamber between an end of said chamber and an end of said valve member in the portion of said chamber into which said third port opens for moving said valve member from said second position back to said first position to reset said valve device.

5. A valve device in accordance with claim 4 including means connected with said housing for engaging and operating said reset piston to reset said valve member of said valve device from said second back to said first position.

6. A valve device in accordance with claim 5 wherein said reset means comprises an operator member connected with said housing and engageable with an extendable end of said reset piston to move said piston from said second back to said first position.

* * * * *